United States Patent [19]

Woodier

[11] 4,040,392

[45] Aug. 9, 1977

[54] ROTARY ENGINE MODIFIED FOR LOW EMISSIONS

[75] Inventor: George H. Woodier, Ringwood, N.J.

[73] Assignee: Curtiss-Wright Corporation, Wood-Ridge, N.J.

[21] Appl. No.: 695,046

[22] Filed: June 11, 1976

[51] Int. Cl.² .............................................. F02B 53/00
[52] U.S. Cl. ................................................. 123/8.45
[58] Field of Search .................... 123/8.09, 8.11, 8.13, 123/8.45

[56] References Cited

U.S. PATENT DOCUMENTS

| 3,393,666 | 7/1968 | Yamamoto et al. | 123/8.45 |
| 3,754,534 | 8/1973 | Burley | 123/8.45 X |
| 3,848,574 | 11/1974 | Fujikawa et al. | 123/8.09 |

*Primary Examiner*—Carlton R. Croyle
*Assistant Examiner*—Michael Koczo, Jr.
*Attorney, Agent, or Firm*—Victor D. Behn; Arthur Frederick

[57] ABSTRACT

A rotary combustion engine and method of operating said engine in which grooves are provided in the engine trochoid surface to permit any unburnt fuel at the trailing end of a working chamber of the engine to blow back into the following working chamber so as to reduce the hydrocarbons in the engine exhaust without any material adverse effect on engine performance.

3 Claims, 3 Drawing Figures

ROTARY ENGINE MODIFIED FOR LOW EMISSIONS

BACKGROUND OF THE INVENTION

The invention relates to rotary internal combustion engines of the type disclosed in U.S. Pat. No. 2,988,065 granted June 13, 1961 to Wankel et al.

In engines of this type, the engine working chambers rotate with the engine rotor and as a result unburnt fuel tends to accumulate in each working chamber adjacent the trailing end of the chamber from which it is discharged into the engine exhaust port. This problem has been recognized in U.S. Pat. No. 3,393,666 granted July 23, 1968 to Yamamoto et al.

In said prior U.S. Pat. No. 3,393,666, one or more grooves are provided in the inner trochoid surface of the rotor housing in the region in which combustion takes place so that when a rotor apex seal passes over the grooves, the pressure differential across the apex seal blows any unburnt fuel into the following working chamber (that is, into the working chamber on the trailing side of said apex seal) for subsequent combustion therein. In U.S. Pat. No. 3,393,666, however, the grooves in the trochoid surface have such length and are so positioned that when an apex seal of the rotor starts across the grooves, the following working chamber (that is, the chamber on the trailing side of said seal) is still open to the engine intake port and before said apex seal passes completely across the grooves, the working chamber on the leading side of the seal opens to the exhaust port. This has several disadvantages. First, any leakage through the grooves in the following working chamber while said following chamber is still open to the intake port will tend to reduce the amount of fresh charge taken into that chamber. In addition, if the working chamber on the leading side of an apex seal opens to an exhaust port before the seal travels completely across the trochoid grooves, then the pressure differential across the seal probably will reverse before the seal is completely across the grooves whereupon there will be a pressure loss from the following chamber into the leading chamber.

SUMMARY OF THE INVENTION

Accordingly, it is an object of the invention to provide a unique arrangement of one or more grooves in the trochoid surface of a rotary engine for permitting any unburnt fuel in the trailing portion of each working chamber to blow back to the follwing chamber but without the aforementioned disadvantages inherent in U.S. Pat. No. 3,393,666.

Specifically, the invention relates to a rotary engine having a housing with an internal cavity, the peripheral surface of which has a multi-lobe profile with the lobes being joined by regions disposed relatively near to the engine axis, and an inner body or rotor is mounted for relative rotation within the housing cavity with the inner body having a plurality of apex portions having sealing cooperation with the multi-lobe surface of the housing cavity to define a plurality of working chambers which vary in volume in response to said relative rotation and with the housing having intake and exhaust ports on opposite sides of one of said near-axis regions, the invention comprising the addition of circumferentially-extending grooves in the multi-lobe surface with the grooves being so positioned that an apex portion of the rotor does not reach the grooves until the working chamber on the trailing side of said apex portion has closed to the intake port and the grooves being of such length that an apex portion of the rotor moves beyond the grooves before the working chamber on the leading side of said apex portion opens substantially to the exhaust port.

With this combination, any unburnt fuel which might accumulate in the trailing region of a working chamber after combustion in said chamber has an opportunity to blow back through said grooves into the following working chamber without adversely affecting the magnitude of the intake charge in said following chamber and at the same time there is not danger of a pressure loss through the grooves from said following chamber.

Other objects of the invention will become apparent upon reading the following detailed description in connection with the drawings.

DESCRIPTION OF THE INVENTION

Figure 2:
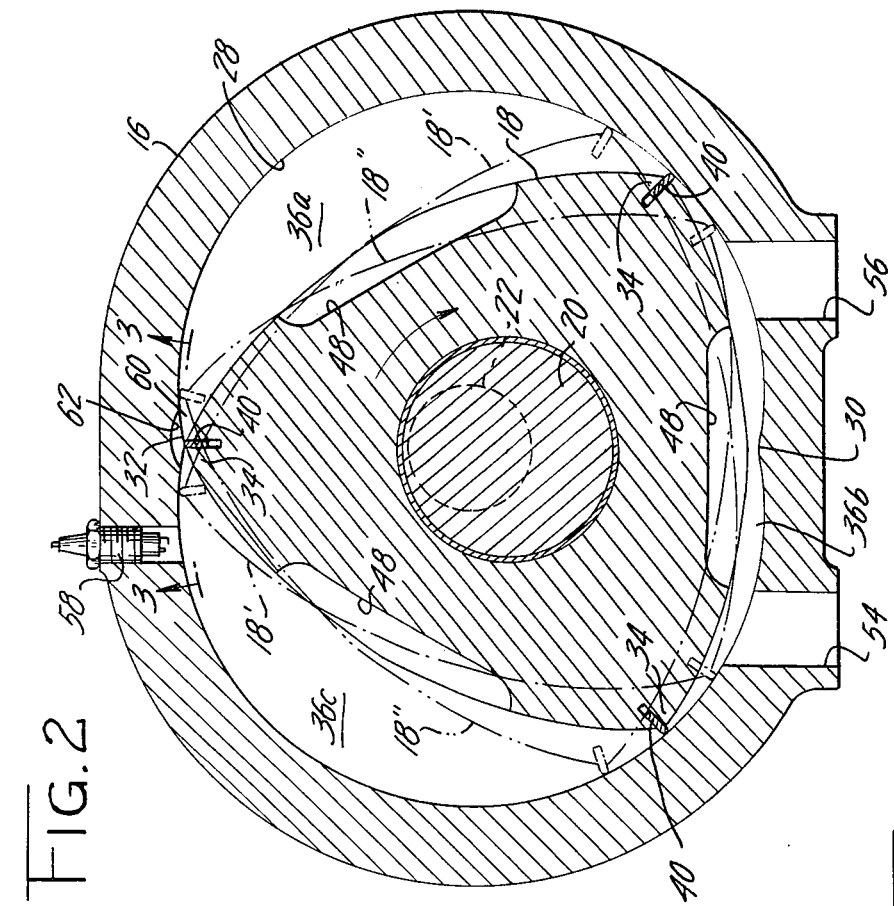
FIG. 2 is a sectional view taken along line 2—2 of FIG. 1.
Figure 3:
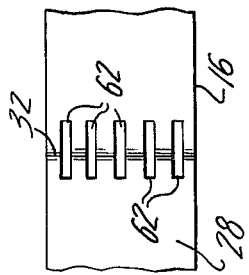
FIG. 3 is a partial view of the rotor housing trochoid surface taken along line 3—3 of FIG. 2.
Figure 1:
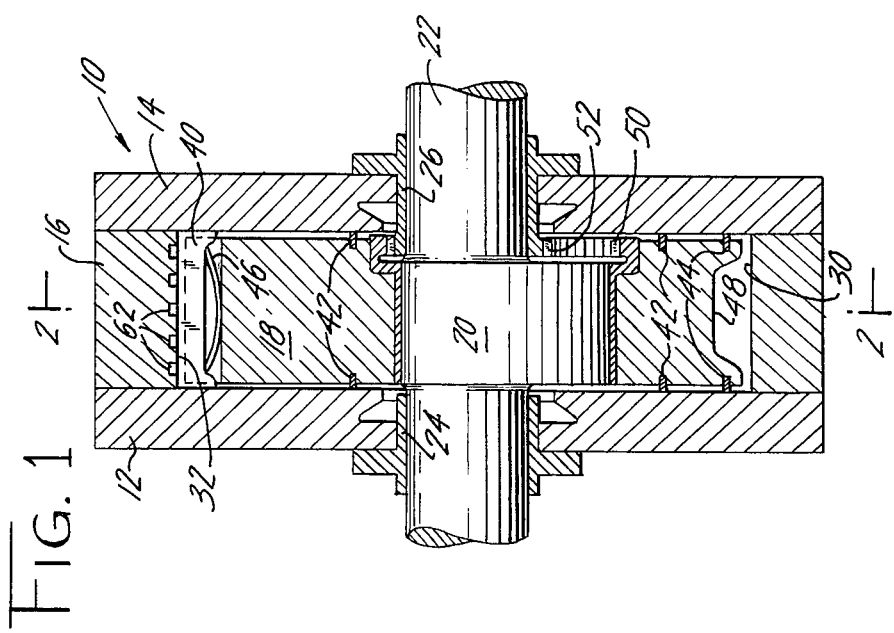
FIG. 1 is an axial sectional view through a rotary engine embodying the invention.

Referring to the drawing, a rotary combustion engine is schematically indicated at 10, the engine being generally similar to the type of rotary engine disclosed in the aforementioned patents. The engine 10 comprises an outer body or housing consisting of two axially-spaced end housings 12 and 14 and an intermediate or rotor housing 16, these housings being secured together to form the engine cavity therebetween. An inner body or rotor 18 is journaled for rotation within said housing cavity on an eccentric portion 20 of a shaft 22, said shaft extending through the end housings 12 and 14 and being supported by bearings 24 and 26 respectively in said end housings.

The peripheral inner surface 28 of the intermediate housing 16 is illustrated as having a two-lobe profile which preferably is basically an epitrochoid, said two lobes joining at diametrically opposed junctions or near-axis regions 30 and 32. The rotor or inner body 18 has generally triangular profile with apex portions 34 having sealing cooperation with the trochoidal surface to form three engine working chambers 36 between the rotor 18 and engine housing 12, 14, and 16. These three working chambers are distinguished from each other by the reference letters a, b and c respectively. For this purpose each of the rotor apex portions 34 is provided with a seal 40 which extends across the rotor between the inner walls of the end housings 12 and 14, and the rotor also has suitable seals 42 and 44 on its end faces for sealing contact with said inner walls of the end housings. As is conventional, suitable springs preferably are provided behind each of the seals 40, 42 and 44. However, only a spring 46 behind each apex seal 40 has been illustrated. Each of the three peripheral surfaces of the rotor 18 is provided with a trough-like recess 46.

The rotary engine 10 also includes suitable gears 50 and 52 which are connected to the engine rotor 18 and end housing 14, respectively, to control the relative rotation of the rotor, such gearing being conventional in such engines. In addition, the engine 10 has an air intake passage 54 disposed adjacent to and on one side of the near-axis region 30 of the trochoid surface 28 and an exhaust passage 56 disposed adjacent to and on the other side of said near-axis region 30. A spark plug 58 is disposed adjacent to the other near-axis region 32 of the trochoid surface 28 for initiating combustion in the working chambers 36.

The engine structure so far described is conventional and is generally similar to that described in the aforementioned patents. With such an engine, during engine operation and with the rotor rotating clockwise, as viewed in FIG. 2, the volume of each working chamber 36 periodically increases from a minimum volume condition when it is located adjacent to the lobe junction 30 and is open to the intake passage 54, to a maximum volume condition and closes to said intake passage and then said chamber decreases in volume to compress its intake charge until said working chamber again reaches a minimum volume condition, but this time adjacent to the lobe junction 32. Thereafter, the volume of said chamber again increases to a maximum and then decreases to a mimimum as the chamber comes into communication with the exhaust port adjacent to the lobe junction 30 to complete the cycle for said chamber. Each of the other working chambers 36 in sequence goes through the same cycle as the engine operates With such an engine, after combustion has been initiated in a working chamber 36, probably because of its inertia, unburnt fuel tends to accumulate at the trailing end of the chamber. Accordingly, when this chamber opens to the exhaust passage 56, this unburnt fuel discharges into the exhaust passage thereby adding to the unburnt hydrocarbons in the engine exhaust emission. For example, with the engine rotor 18 in the position shown in full lines in FIG. 2, combustion has already been initiated in chamber 36a and this chamber is going through its expansion stroke. Unburnt fuel tends to collect at the trailing end or region 60 of this chamber 36a.

When the rotor 18 is in its full line position, as shown in FIG. 2, the pressure in the working chamber 36a is greater than the pressure in the following chamber 36c. This direction of the pressure differential across the apex seal 40 is disposed between the working chambers 36a and 36c exists during the initial portion of the compression phase of the chamber 36c and continues until the chamber 36a has opened substantially to the exhaust passage 56. The present invention takes advantage of this pressure differential to cause the unburnt fuel which collects at the trailing region 60 of a working chamber to be blown back from this region into the following working chamber 36c. For this purpose, a plurality of circumferentially-extending side-by-side notches or grooves 62 are provided in the trochoid surface 28 adjacent to the near-axis region 32.

Thus, when the rotor 18 is in its full line position of FIG. 2, unburnt fuel in the region 60 at the trailing end of the working chamber 36a is blown back through the grooves 62 into the following working chamber 36c. Here this unburnt fuel mixes with the charge in said following chamber for subsequent recombustion. In this way the unburnt fuel accumulating in the trailing region 60 of each working chamber is not discharged into the exhaust passage 56 thereby minimizing the hydrocarbons in the exhaust discharged from the engine and reducing the engine fuel consumption.

In accordance with the invention, this clean-up of the engine exhaust is accomplished without any material adverse effect on engine performance. For this purpose the grooves 62 are so positioned that an apex seal 40 does not start to move across said grooves until the following working chamber 36 has already been closed to the intake passage 54. Thus, as shown in FIG. 2, when the rotor is in its dash-dot line position, designated 18', the chamber 36c has just closed to the intake passage 54 and the apex seal 40 between the chambers 36c and 36a has not yet reached the grooves 62. This is important because if the chambers 36c and 36a were interconnected by the grooves 62 before the chamber 36c closed to the intake passage 54, a high pressure leakage from the chamber 36a into chamber 36c would raise the pressure in the chamber 36c thereby reducing the magnitude of the charge drawn into the chamber 36c from the intake passage 54 to reduce the engine power output.

The grooves 62 are also so positioned, and/or are of such length, that an apex seal 40 moves beyond said grooves before the working chamber 36 on its leading side has moved into substantial communication with the exhaust passage 56. Thus, as shown in FIG. 2, when the rotor is in its dash-double-dot line positon, designated 18", the apex seal 40 at the trailing end of working chamber 36a has already moved beyond the grooves 62 and said chamber is just about to start to open but has not yet opened to the exhaust passage 56. This is important because once the chamber 36a moves into substantial communication with the exhaust passage 56, the pressure differential across the trailing apex seal reverses. That is, the pressure in the following working chamber 36c then becomes larger than the pressure in the chamber 36a. If an apex seal 40 were still moving across the grooves 62 when this pressure reversal occurs, then some of the high compression pressure in the following chamber 36c would escape through the grooves 62 into the chamber 36a with resulting loss in engine power. Also, the cross-sectional area of the grooves 62 preferably is such that the quantity of combustion gases blown back through these grooves, although small, is sufficient to carry the major portion of the unburnt fuel 60 along with it into the following working chamber 36c.

The invention has been described in connection with a rotary engine in which the trochoid surface 28 has two lobes. The invention, however, obviously could be used with a rotary engine having more than two lobes such as shown in the aforementioned patent to Wankel et al. Also, although the invention has been described in connection with a rotary engine in which the intake passage 54 opens through the rotor housing 16, it obviously could also be used with a rotary engine in which the intake passage opens into the engine through one or both of the engine side walls 12 and 14 in lieu of, or in addition to, the intake passage 54 through the rotor housing. It should be understood that these and other changes may occur to one skilled in the art without departing from the spirit or scope of the invention.

What is claimed is:

1. A rotary combustion engine comprising:
   a. an outer body having a peripheral wall and a pair of side walls defining an internal cavity and having an axis transverse to said side walls, the inner surface of said peripheral wall having a multi-lobe profile in which the lobes are joined by regions disposed relatively near to said axis;
   b. an inner body of generally polygonal profile mounted for relative rotation within said outer body cavity, the apex portions of said inner body having sealing cooperation with said multi-lobe peripheral surface to define a plurality of working chambers which vary in volume in response to said relative rotation;

c. said outer body also having an intake port and an exhaust port for communication with said working chambers and disposed adjacent to and on opposite sides of one of said near-axis regions; and d. said outer body having a plurality of side-by-side circumferentially-extending grooves in its multi-lobe periperal surface adjacent to a near-axis region at which combustion takes place, said grooves being positioned so that an apex portion of the inner body does not reach said grooves until the working chamber on it trailing side has closed to said intake port.

2. A rotary combustion engine as claimed in claim 1 in which the peripheral surface of the said engine cavity is basically an epitrochoid having two lobes and said inner body has a triangular profile.

3. A rotary combustion engine as claimed in claim 2 and in which each of said grooves is of such length that an apex portion of the inner body moves beyond said groove before the working chamber on the leading side of said apex portion opens substantially to said exhaust port.

* * * * *